US006969977B1

(12) United States Patent
Smith

(10) Patent No.: US 6,969,977 B1
(45) Date of Patent: Nov. 29, 2005

(54) SOFT-START VOLTAGE REGULATOR CIRCUIT

(75) Inventor: Gregory J. Smith, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/865,012

(22) Filed: Jun. 10, 2004

(51) Int. Cl.[7] .......................... G05F 1/652; G05F 1/613

(52) U.S. Cl. ....................... 323/222; 323/284; 323/901

(58) Field of Search ................................ 323/222, 282, 323/284, 901, 908; 363/49

(56) References Cited

U.S. PATENT DOCUMENTS

| | | | | |
|---|---|---|---|---|
| 5,625,279 A | * | 4/1997 | Rice et al. | 323/283 |
| 5,978,195 A | | 11/1999 | Goder et al. | |
| 6,633,193 B1 | | 10/2003 | Halamik et al. | |
| 6,650,099 B2 | * | 11/2003 | Mitamura et al. | 323/282 |
| 6,737,845 B2 | * | 5/2004 | Hwang | 323/284 |
| 6,871,289 B2 | * | 3/2005 | Pullen et al. | 713/300 |

OTHER PUBLICATIONS

L. Wofford, "Meeting ISDN Requirements in a Switch Mode Power Converter", IEEE, 1992, pp. 463-470.

* cited by examiner

Primary Examiner—Bao Q. Vu
(74) Attorney, Agent, or Firm—Darby & Darby P.C.; Matthew M. Gaffney

(57) ABSTRACT

A voltage regulator includes a soft-start circuit, an error amplifier, an output stage, a voltage divider, and a soft-start switch. The output stage is arranged to provide an output voltage from an input voltage and an error signal. The voltage divider is arranged to provide a feedback signal from the output voltage. The error amplifier is arranged to provide the error signal from a soft-start reference voltage and the feedback signal. The soft-start circuit is arranged to provide the soft-start reference voltage from a reference voltage. If the voltage regulator is enabled, the soft-start reference voltage ramps toward the reference voltage until the soft-start reference voltage reaches the reference voltage. The soft-start switch is coupled across the inputs of the error amplifier. If the voltage regulator is disabled, the soft-start switch is closed. Closing the soft-start switch causes the soft-start reference voltage to track the decaying output voltage during disable.

20 Claims, 7 Drawing Sheets

SOFT-START VOLTAGE REGULATOR CIRCUIT

FIELD OF THE INVENTION

The invention is related to voltage regulator circuits, and in particular, to a soft-start voltage regulator circuit that is arranged such that the reference voltage seen by the error amplifier substantially tracks the output voltage during disable.

BACKGROUND OF THE INVENTION

A step-down switching regulator may be configured to provide a regulated output voltage (Vout) in response to an input voltage (Vin). The switching regulator may include a top-side transistor and a bottom-side transistor. When the top-side transistor is on and the bottom-side transistor is off, Vin-Vout is typically applied across an inductor, causing the inductor current to ramp upwards. When the top-side transistor is off and the bottom-side transistor is on, the inductor current ramps downwards. The inductor current is applied to a capacitor to provide the output voltage. Also, feedback may be employed to control the duty cycle of the switching. The output voltage may be sensed to provide the feedback.

BRIEF DESCRIPTION OF THE DRAWINGS

Non-limiting and non-exhaustive embodiments of the present invention are described with reference to the following drawings, in which.

DETAILED DESCRIPTION

Figure 1:
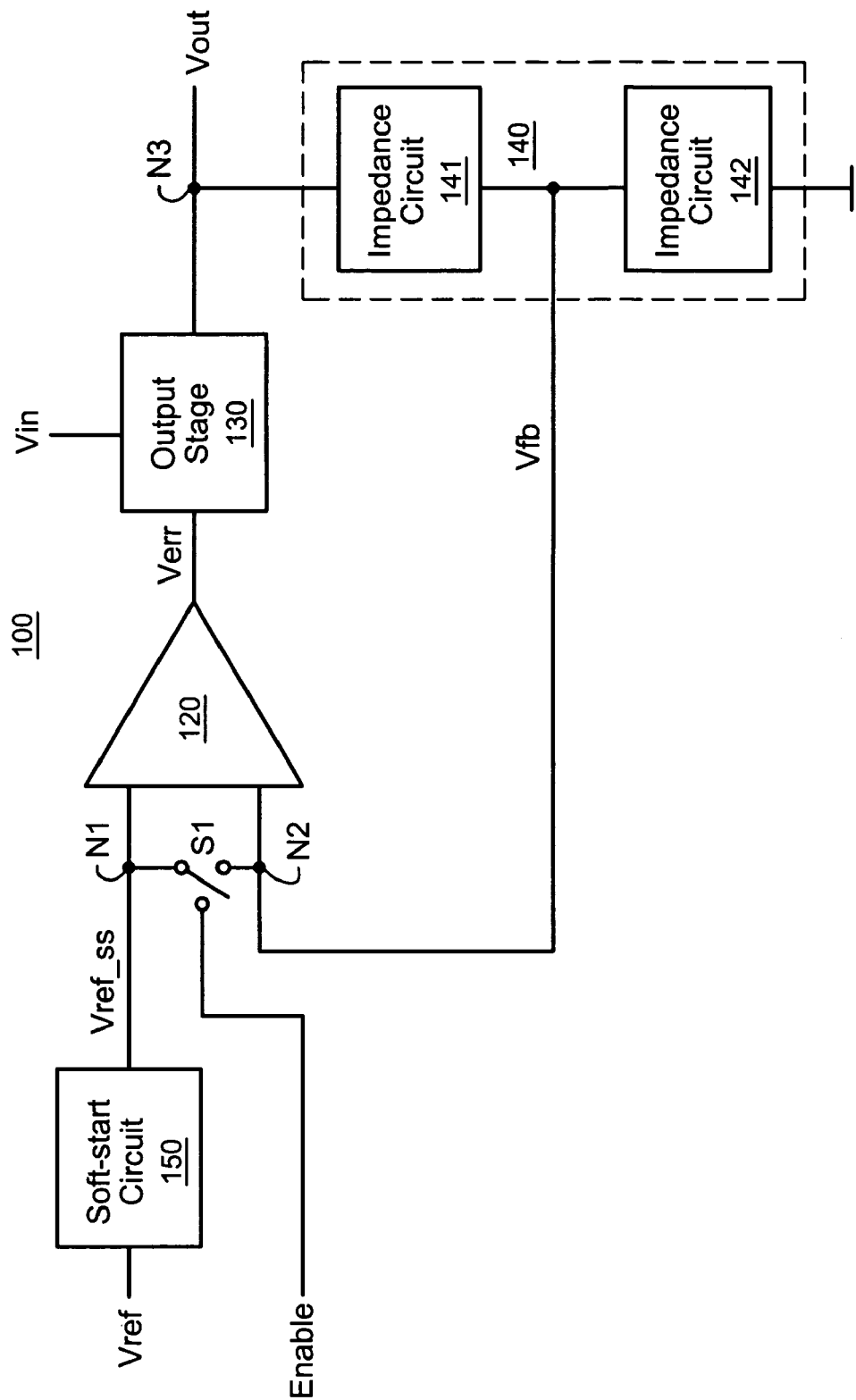
FIG. 1 shows a block diagram of an embodiment of a voltage regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a voltage regulator that includes a soft-start circuit, an error amplifier, an output stage, a voltage divider, and a soft-start switch. The output stage is arranged to provide an output voltage from an input voltage and an error signal. Also, the voltage divider is arranged to provide a feedback signal from the output voltage. The error amplifier is arranged to provide the error signal from a soft-start reference voltage and the feedback signal. Further, the soft-start circuit is arranged to provide the soft-start reference voltage from a reference voltage. If the voltage regulator is enabled, the soft-start reference voltage ramps toward the reference voltage until the soft-start reference voltage reaches the reference voltage. The soft-start switch is coupled across the inputs of the error amplifier. If the voltage regulator is disabled, the soft-start switch is closed. Closing the soft-start switch causes the soft-start reference voltage to substantially track the decaying output voltage during disable.

FIG. 1 shows a block diagram of an embodiment of voltage regulator circuit 100. Voltage regulator circuit 100 includes soft-start circuit 150, soft-start switch circuit S1, error amplifier circuit 120, output stage 130, and voltage divider circuit 140. Voltage divider circuit 140 includes impedance circuit 141 and impedance circuit 142.

Soft-start circuit 150 is configured to provide soft-start reference signal Vref_ss from reference signal Vref. More specifically, soft-start circuit 150 is arranged to provide signal Vref_ss at node N1. During normal operation, soft-start circuit 150 may be arranged to provide signal Vref_ss such that a voltage associated with signal Vref_ss is substantially the same as a voltage that is associated with signal Vref. However, when voltage regulator circuit 100 is enabled (by changing signal Enable from an inactive level to an active level), soft-start circuit 150 may be arranged to adjust the voltage associated with signal Vref_ss towards the voltage associated with signal Vref relatively slowly. In one embodiment, when voltage regulator circuit 100 is enabled, soft-start circuit 150 is arranged to provide signal Vref_ss such that the voltage associated with signal Vref_ss ramps toward the voltage that is associated with signal Vref until the voltage associated with signal Vref_ss reaches the voltage associated with signal Vref.

Additionally, error amplifier circuit 120 is configured to provide error signal Verr by amplifying the voltage difference between nodes N1 and N2. Output stage 130 is arranged to provide a regulated output voltage Vout from input signal Vin, responsive to signal Verr. In one embodiment, input signal Vin is an unregulated input signal. Output stage 130 may be arranged to provide substantially no power to node N3 when signal Enable is inactive. In one embodiment, output stage 130 is tri-stated when signal Enable is inactive.

Also, voltage divider circuit 140 is arranged to provide feedback signal Vfb from signal Vout.

Soft-start switch circuit S1 is coupled between nodes N1 and N2. Soft-start switch circuit S1 is configured to close if signal Enable corresponds to an inactive level, and to open if signal Enable corresponds to an active level. More specifically, soft-start circuit S1 may be arranged to adjust a resistance between nodes N1 and N2. Accordingly, if signal Enable corresponds to an inactive level, nodes N1 and N2 may be substantially shorted together. However, if signal Enable corresponds to an active level, soft-start circuit S1 may be substantially an open circuit.

Figure 2:
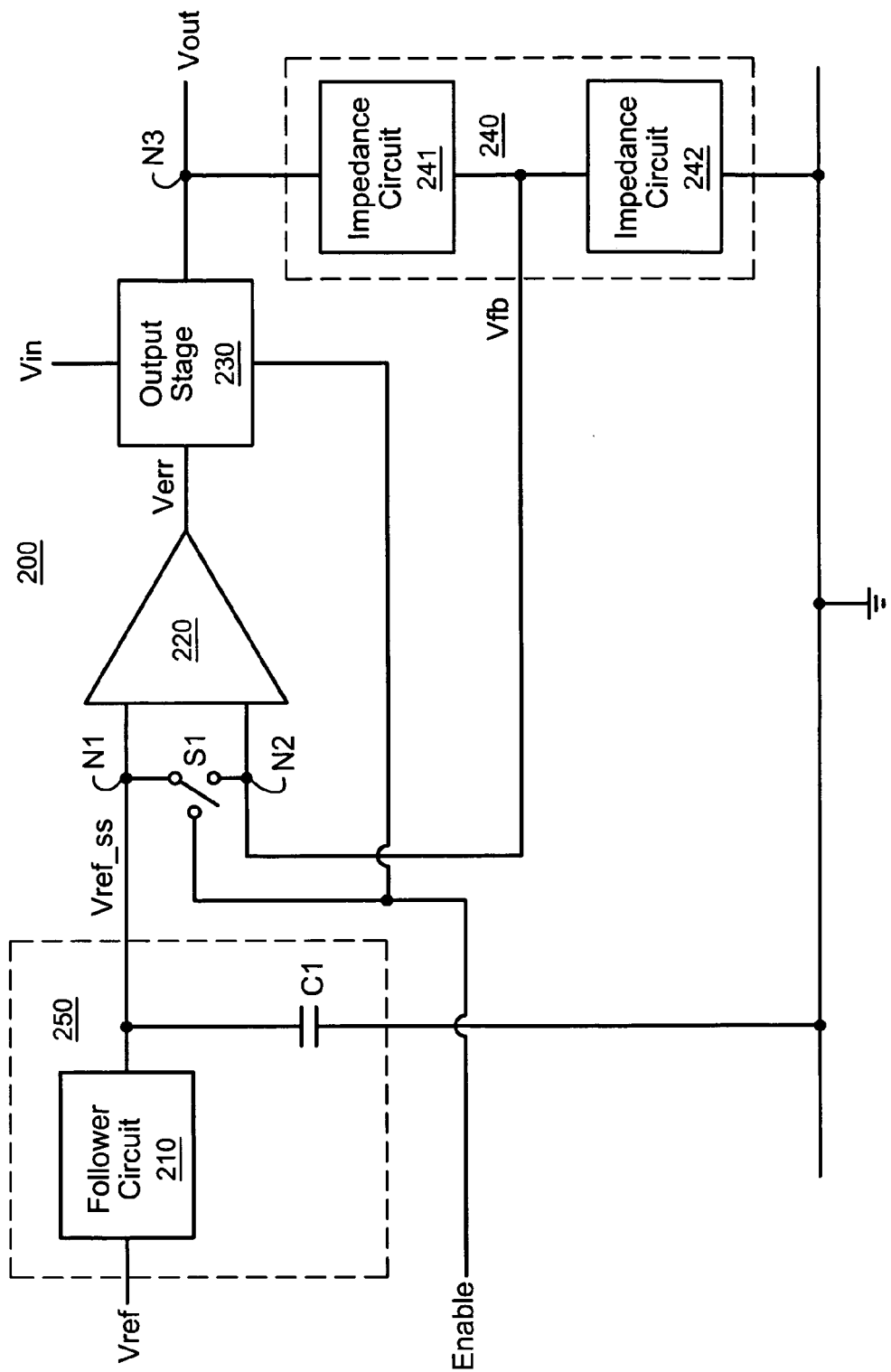
FIG. 2 illustrates a block diagram of an embodiment of a voltage regulator circuit that illustrates an embodiment of the soft-start circuit of FIG. 1.

FIG. 2 illustrates a block diagram of an embodiment of voltage regulator circuit 200, in which an embodiment of a soft-start circuit is illustrated. Components in voltage regulator circuit 200 may operate in a substantially similar manner to similarly-named components in voltage regulator circuit 100, and may operate in a different manner in some ways. Soft-start circuit 250 includes follower circuit 210 and soft-start capacitor circuit C1.

Follower circuit 210 is arranged to provide signal Vref_ss from signal Vref. Follower circuit 210 has a limited output current drive. Soft-start capacitor circuit C1 is arranged to control a rate of change of a voltage that is associated signal Vref_ss. Accordingly, the voltage associated with signal Vref_ss follows the voltage that is associated with signal Vref. However, when voltage regulator circuit 200 is first enabled, the voltage associated with signal Vref_ss ramps towards signal Vref until the voltage associated with signal Vref_ss reaches the voltage that is associated with signal Vref. The output current limit of follower circuit 210 is well-controlled such that the ramp rate of signal Vref_ss is well-controlled.

Figure 3:
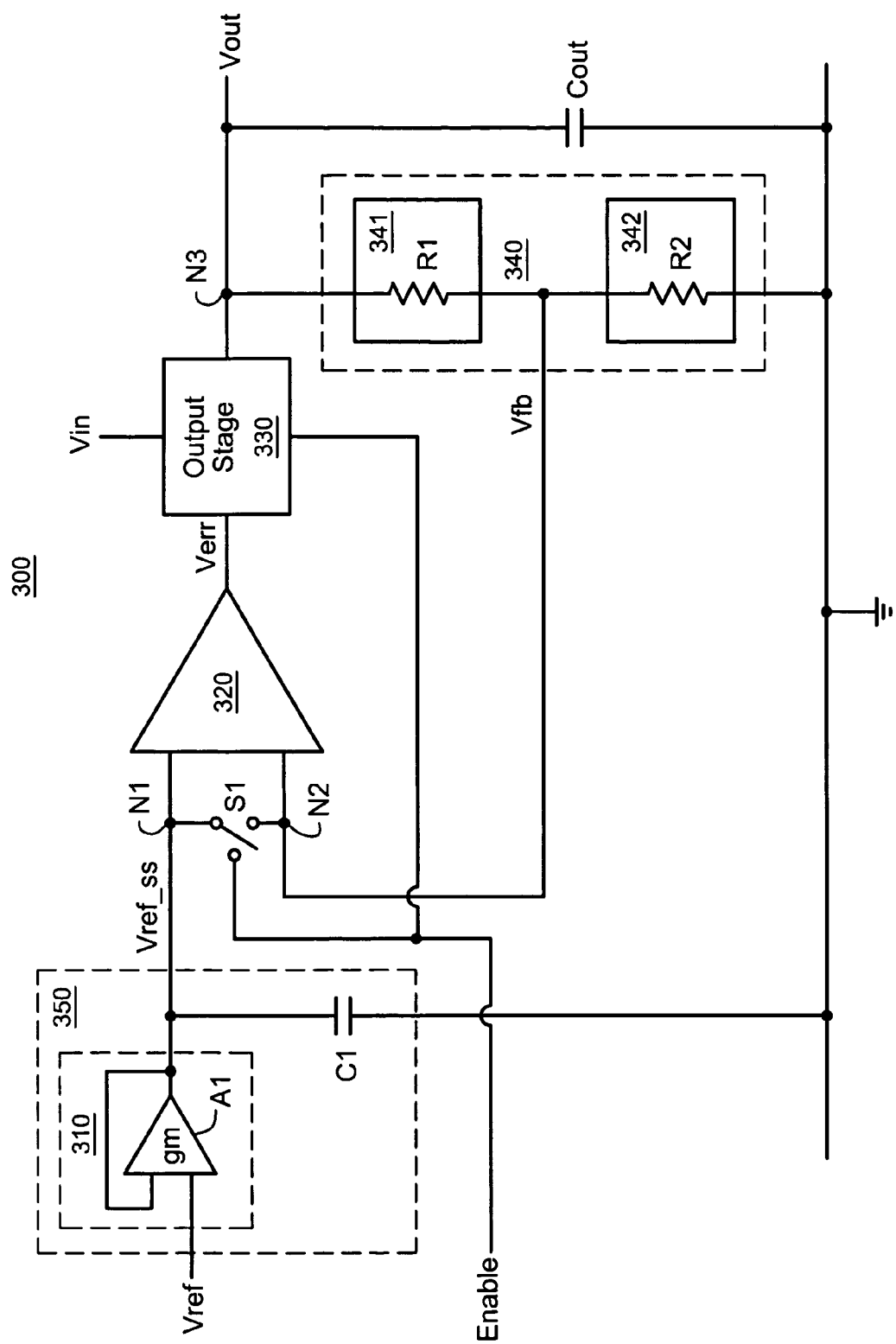
FIG. 3 shows a block diagram of an embodiment of the voltage regulator circuit of FIG. 2.

FIG. 3 shows a block diagram of an embodiment of voltage regulator circuit 300. Components in voltage regulator circuit 300 may operate in a substantially similar manner to similarly-named components in voltage regulator circuit 200, and may operate in a different manner in some ways. Voltage regulator circuit 300 further includes output capacitor circuit Cout. Output current-limited follower circuit 310 includes transconductance circuit A1. In other embodiment, transconductance circuit A1 may be replaced with a current-limited operational amplifier, and the like. Impedance circuit 341 includes resistor circuit R1. Similarly, impedance circuit 342 includes resistor circuit R2.

Also, switch circuit S1 is arranged such that, if voltage regulator circuit 300 is disabled (by changing signal Enable from an active level to an inactive level), nodes N1 and N2 are substantially shorted together. When signal Enable corresponds to an inactive level, voltage Vout overdrives the voltage at node N1, overpowering the current-limited current driver of follower circuit 310. This causes the voltage at node N1 to become substantially equal to the voltage associated with signal Vfb. Since output stage 330 is disabled when signal Enable is inactive, signal Vout decays at a rate that is based on capacitor circuit Cout and the output load (not shown). Signal Vref_ss substantially tracks signal Vout as signal Vout decays.

Figure 4:
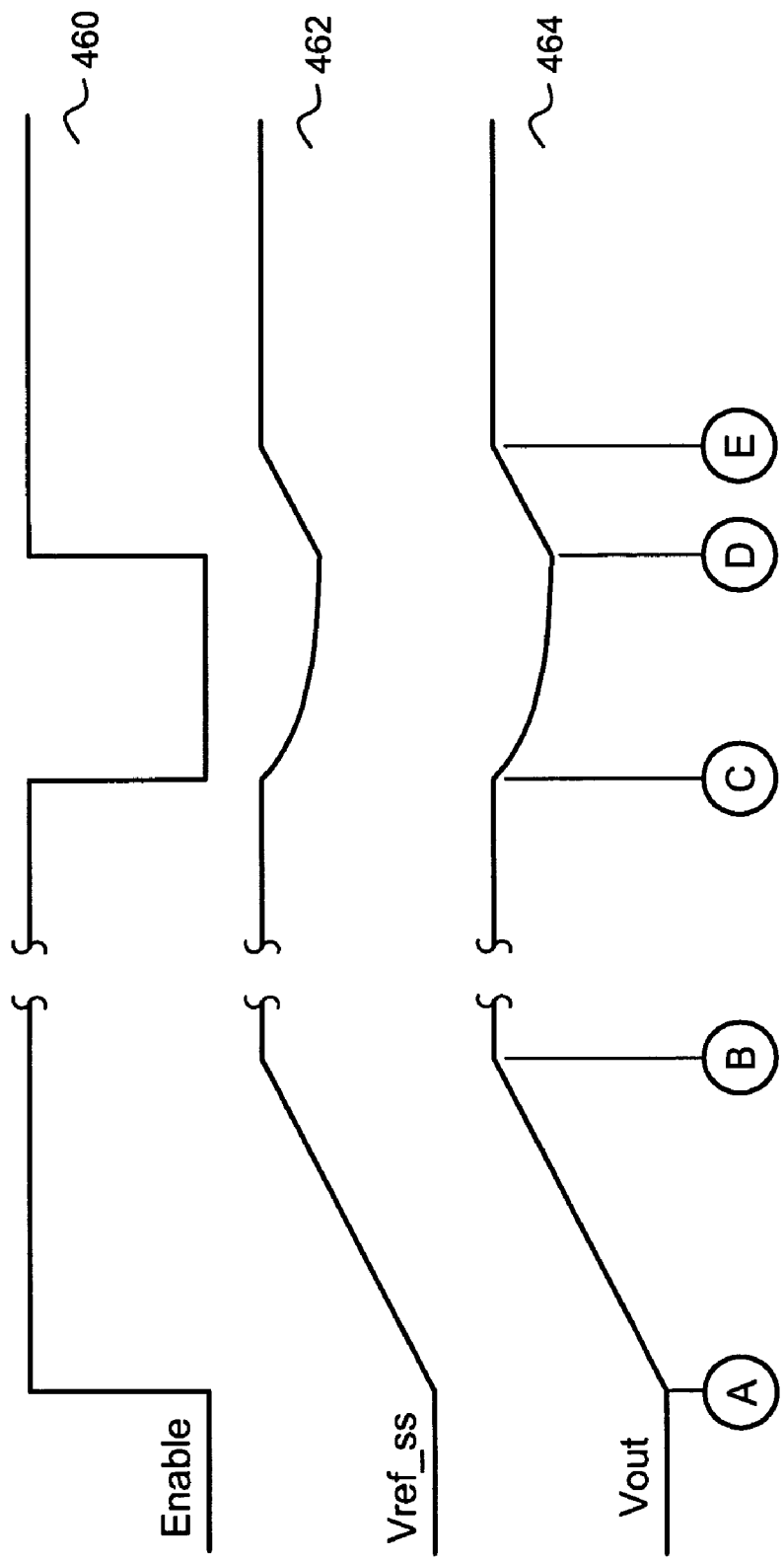
FIG. 4 illustrates a timing diagram of waveforms of embodiments of signals from FIG. 3.

The operation of voltage regulator circuit 300 may be more easily understood with reference to FIG. 4.

FIG. 4 illustrates a timing diagram of waveforms of embodiments of signals Enable, Vref_ss, and Vout from FIG. 3. Waveform 460 is a waveform of an embodiment of signal Enable. Waveform 462 is a waveform of an embodiment of signal Vref_ss. Waveform 464 is a waveform of an embodiment of signal Vout.

For the embodiment of signal Enable illustrated by waveform 460, signal Enable changes from an inactive level (e.g. low) to an active level (e.g. high) at time A. Accordingly, as explained above, voltage Vref_ss ramps upwards towards voltage Vref. The operation of voltage regulator circuit 300 causes voltage Vout to be regulated such that voltage Vfb substantially tracks voltage Vref_ss as voltage Vref_ss ramps upwards. The feedback loop is active from time A to time B, but voltage Vref_ss ramps up relatively slowly, so voltage Vfb tracks it.

At time B, voltage Vref_ss substantially reaches voltage Vref. Accordingly, at this point, voltage Vref_ss remains substantially the same as voltage Vref. Also, signal Vout is regulated such that signal Vout remains substantially at the desired output voltage level.

For the embodiment of signal Enable illustrated by waveform 460, signal Enable changes from the active level (e.g. high) to the inactive level (e.g. low) at time C. Accordingly, as explained above, voltage Vout decays, and voltage Vref_ss substantially tracks voltage Vfb. Because voltage Vref_ss substantially tracks voltage Vfb, excessive inrush currents may be prevented when signal Enable is asserted since signal Verr is relatively near zero.

For the embodiment of signal Enable illustrated by waveform 460, signal Enable again changes from an inactive level (e.g. low) to an active level (e.g. high) at time D. Similar to time A, voltage Vref_ss ramps upwards towards voltage Vref. However, it is noteworthy that signal Vref_ss does not ramp upwards from 0V at time D. Rather, voltage Vref_ss ramps upwards from a voltage that is relatively close to voltage Vref. Accordingly, after signal Enable changes to the active level at time D, signal Vout may reach the desired output voltage relatively quickly, without causing excessive inrush currents.

Voltage regulator circuit 300 may be turned on and off rapidly for power management purposes and to reduce wasted power. By causing signal Vref_ss to track the decaying output voltage when voltage regulator circuit 300 is disabled, start-up time may be substantially optimized for short disable events. Also, the slow-start topology shown in FIG. 3 may prevent large inrush currents which might otherwise exceed safe current ratings of devices in voltage regulator circuit 300, may prevent excessive energy from being wasted by capacitor circuit Cout.

Figure 5:
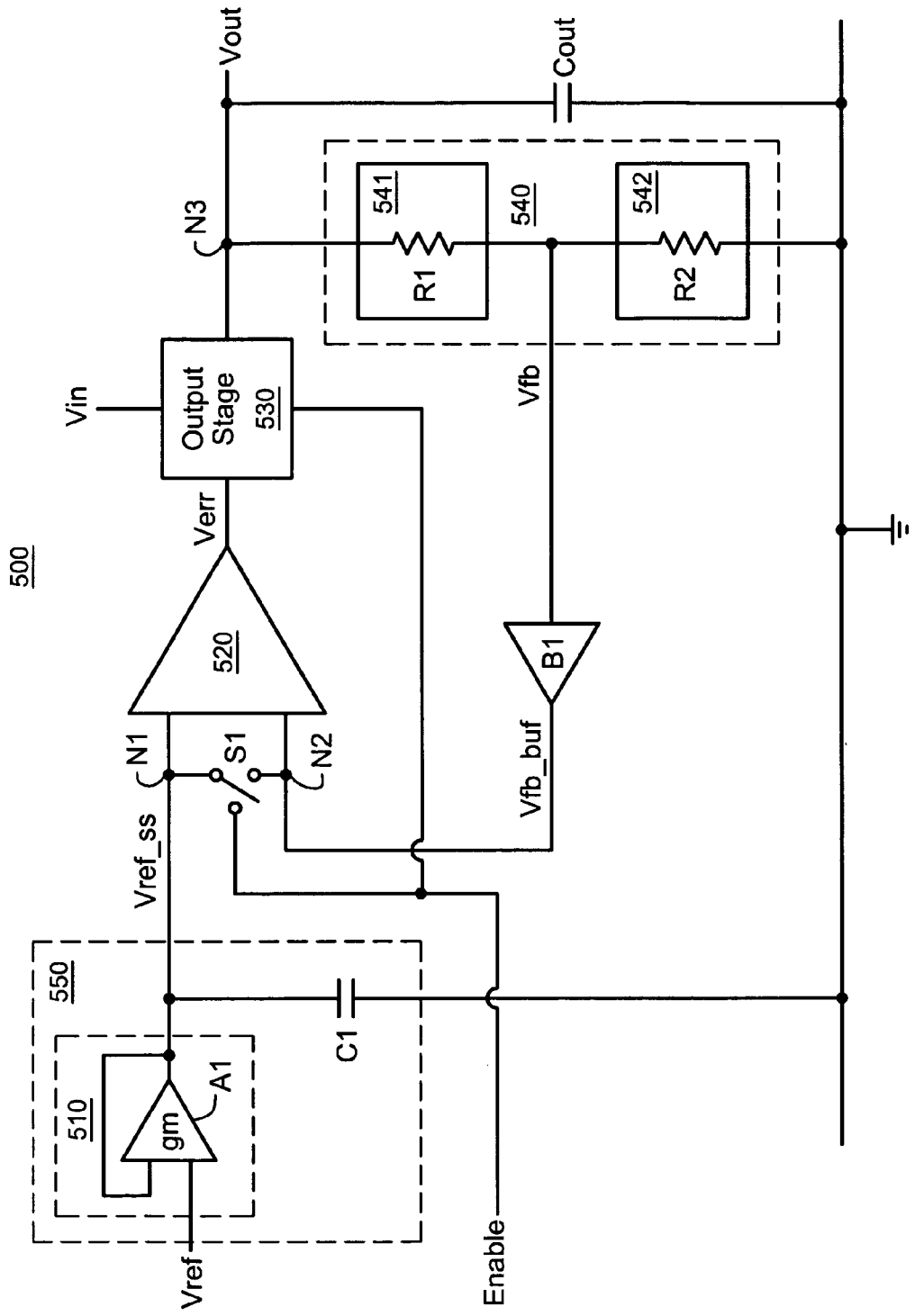
FIG. 5 shows a block diagram of an embodiment of the voltage regulator circuit of FIG. 3 that includes a buffer circuit.

FIG. 5 shows a block diagram of an embodiment of voltage regulator circuit 500 that includes a buffer circuit. Components in voltage regulator circuit 500 may operate in a substantially similar manner to similarly-named components in voltage regulator circuit 300, and may operate in a different manner in some ways. Voltage regulator circuit 500 further includes buffer circuit B1.

Buffer circuit B1 is arranged to provide error amplifier input signal Vfb_buf at node N2 by buffering signal Vfb. This enables capacitor circuit C1 to be driven without the slew-limiting impedance of voltage divider circuit 540.

Figure 6:
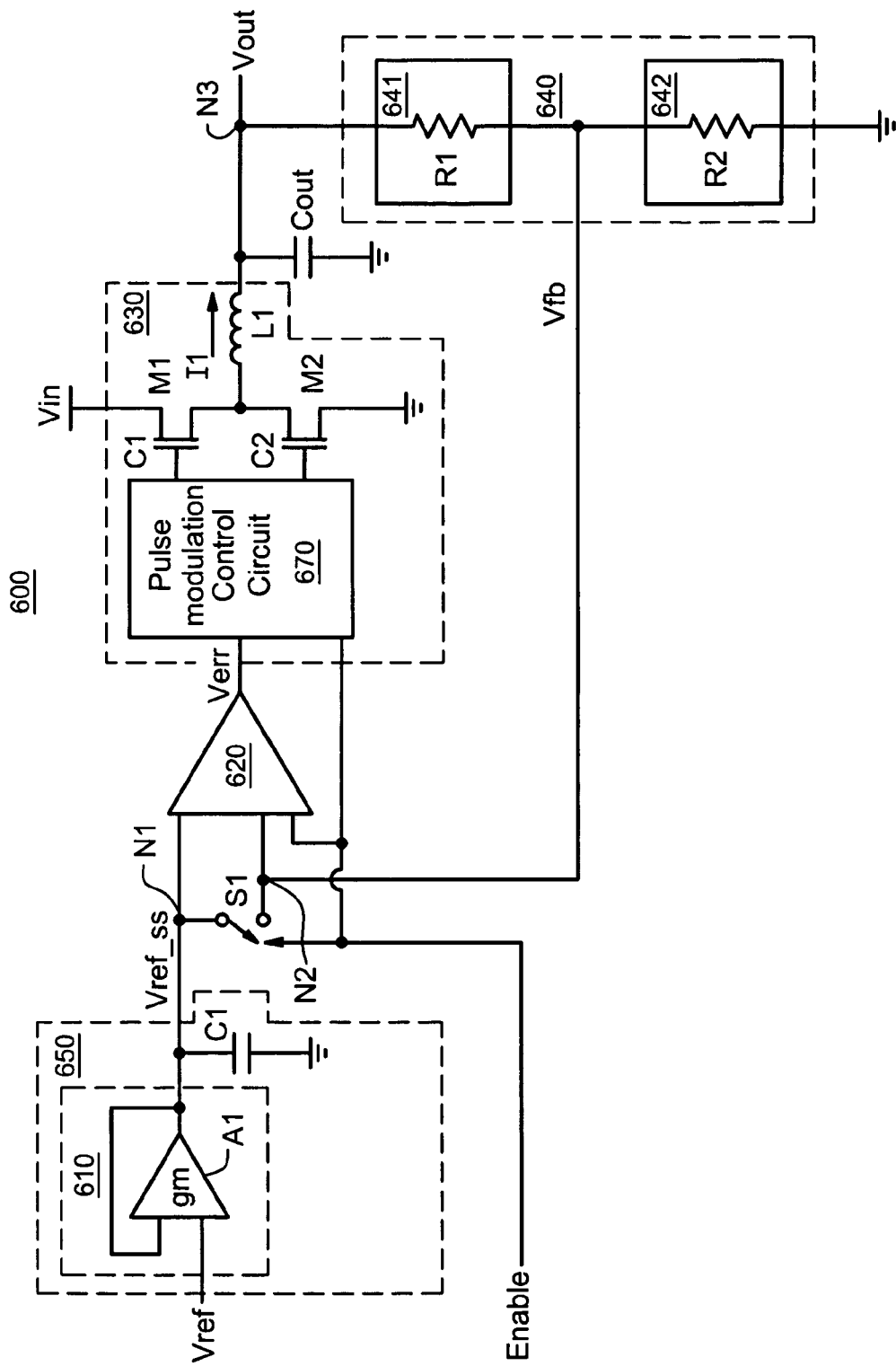
FIG. 6 schematically illustrates an embodiment of the voltage regulator circuit of FIG. 3 that is a switching voltage regulator circuit.

FIG. 6 schematically illustrates an embodiment switching voltage regulator circuit 600. Components in switching voltage regulator circuit 600 may operate in a substantially similar manner to similarly-named components in voltage regulator circuit 300, and may operate in a different manner in some ways. Output stage 630 includes pulse modulation control circuit 670, transistors M1–M2, and inductor L1.

Transistor M1 is arranged to operate is a high-side switch that opens and closes responsive to control signal C1. Similarly, transistor M2 is arranged to operate as a synchronous switch that opens and closes responsive to control signal C2. When transistor M1 is on and the transistor M2 is off, Vin-Vout is applied across inductor L1, causing inductor current I1 to ramp (e.g. increasing). When transistor M1 is off and the transistor M2 is on, inductor current I1 ramp in the reverse direction (e.g. decreasing).

Pulse modulation control circuit 670 is arranged to provide control signal C1 and C2 responsive to signal Verr. In one embodiment, pulse modulation control circuit 670 is a pulse width modulation (PWM) control circuit that is arranged to modulate the duty cycle of signal C1 responsive to signal Verr. In another embodiment, pulse modulation control circuit 670 is a pulse frequency modulation (PFM) control circuit that is arranged to modulate the frequency of signal C1 responsive to signal Verr. In one embodiment, pulse modulation control circuit 670 is arranged to provide signal C2 such that signal C2 is an inverse of signal C1 if signal enable is active. In one embodiment, pulse modulation control circuit 670 is further arranged to provide signal C2 such that signal C2 corresponds to a non-asserted level (i.e. low) if signal enable is inactive. This way, transistors M1 and M2 are both off during disable.

In one embodiment, as illustrated in FIG. 6, error amplifier circuit 620 is arranged to receive signal Enable. In this embodiment, error amplifier circuit 620 is arranged to provide signal Verr at a predetermined voltage if signal Enable is inactive. By providing signal Verr at a known voltage if signal Enable is inactive, error amplifier circuit 620 operates in a known operating condition that may make its operation predictable, and may make error amplifier 620 more responsive when signal Enable changes to the active logic level.

Although switching voltage regulator circuit 600 is shown as a buck regulator in FIG. 6, in other embodiments, switching voltage regulator circuit 600 may be a boost regulator, an inverting regulator, and the like. Additionally, although a synchronous switch (transistor M2) is shown and described in FIG. 6, the synchronous switch may be replaced with a diode in other embodiments, without departing from the scope and spirit of the invention.

Figure 7:
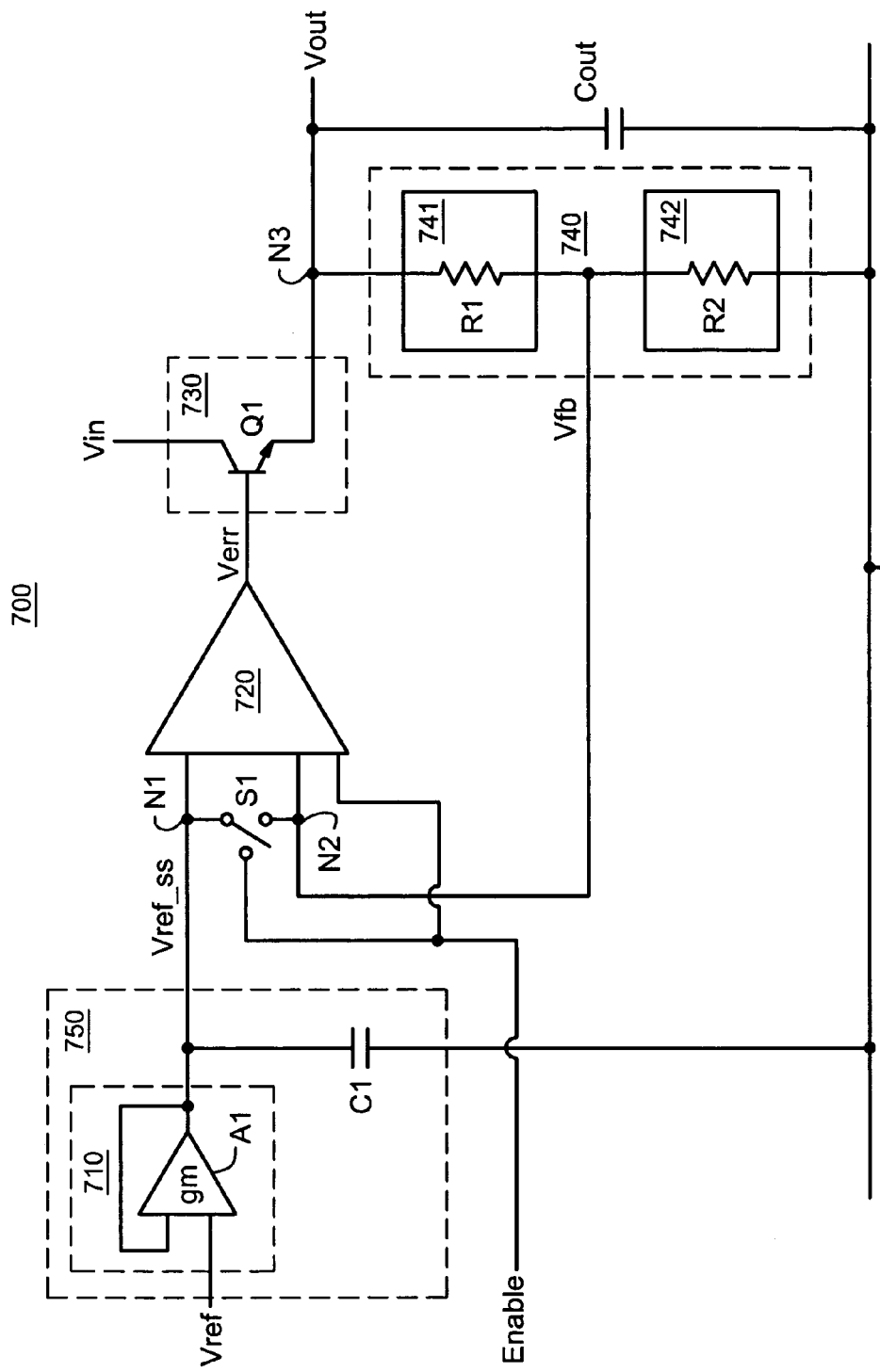
FIG. 7 schematically illustrates an embodiment of the voltage regulator circuit of FIG. 3 that is a linear regulator circuit, arranged in accordance with aspects of the invention.

FIG. 7 schematically illustrates an embodiment of linear voltage regulator circuit 700. Components in linear voltage regulator circuit 700 may operate in a substantially similar manner to similarly-named components in voltage regulator circuit 300, and may operate in a different manner in some ways. Output stage 730 includes may include transistor Q1. Transistor Q1 is arranged as a series pass transistor that configured to provide signal Vout from signal Vin, responsive to signal Verr.

Although transistor Q1 is shown as a bipolar junction transistor (BJT) in FIG. 7, transistor Q1 may also be a metal-oxide-semiconductor field effect transistor (MOSFET), and the like.

Also, although not shown in FIG. 7, output stage 730 may further include an active pulldown transistor. By causing signal Vref_ss to track the decaying output voltage when voltage regulator circuit 700 is disabled, the active pulldown transistor can be protected during short disable events.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A voltage regulator circuit, comprising:
   a soft-start circuit that is configured to provide a soft-start reference signal from a reference signal, wherein the soft-start circuit is arranged to provide the soft-start reference voltage at a first node;
   an error amplifier circuit that is configured to provide an error signal, wherein the error amplifier includes a first input that is coupled to the first node, and a second input that is coupled to a second node; and wherein the error amplifier circuit is arranged to receive, at the second node, an error amplifier input signal that is based, in part, on a regulated output voltage;
   an output stage that is arranged to provide a regulated output voltage based, in part, on an input voltage and the error signal; and
   a soft-start switch circuit that is coupled between the first and second nodes, wherein the soft-start switch circuit is configured to open and close responsive to an enable signal.

2. The voltage regulator circuit of claim 1, wherein the soft-start switch circuit is arranged such that the soft-start reference signal tracks the regulated output voltage if the enable signal corresponds to an inactive level.

3. The voltage regulator circuit of claim 1, wherein the soft-start switch circuit is arranged to adjust a resistance between the first and second nodes responsive to the enable signal such that the first and second nodes are substantially shorted together if the enable signal is inactive, and such that the soft-switch circuit is substantially an open circuit if the enable signal is active.

4. The voltage regulator circuit of claim 1, wherein the output stage includes:
   a pulse modulation control circuit that is arranged to provide a control signal in response to the error signal;
   a switch circuit that is arranged to open and close in response to the control signal; and
   an inductor that is coupled to the switch circuit.

5. The voltage regulator circuit of claim 1, wherein the output stage includes:
   a pulse modulation control circuit that is arranged to provide a control signal in response to the error signal;
   a high-side switch circuit that arranged to open and close in response to the control signal, wherein the switch circuit is coupled to a switch node;
   at least one of a synchronous switch and a diode, wherein the at least one of the synchronous switch and the diode is coupled to the switch node; and
   an inductor that is coupled between the switch node and an output node, wherein the output stage is arranged to provide the regulated output voltage at the output node.

6. The voltage regulator circuit of claim 1, wherein the output stage is configured such that the output stage is enabled if the enable signal is inactive, and wherein the error amplifier is configured such that the error signal corresponds to a predetermined voltage if the enable signal is inactive.

7. The voltage regulator circuit of claim 1, wherein the soft-start circuit includes:
   a follower circuit that is arranged to provide the soft-start reference signal from the input reference signal; and
   a soft-start capacitor circuit that is arranged to control a rate of change of a voltage that is associated with the soft-start reference signal.

8. The voltage regulator circuit of claim 7, wherein the follower circuit includes an amplifier circuit including a first input that is coupled to the first node, a second input that is arranged to receive the reference voltage, and an output that is coupled to the first node, wherein the amplifier circuit includes at least one of a transconductance circuit and an operational amplifier circuit.

9. The voltage regulator circuit of claim 1, wherein the output stage includes a pass transistor.

10. The voltage regulator circuit of claim 9, wherein the pass transistor includes a base that is arranged to receive the error voltage, a collector that is arranged to receive the input voltage, and an emitter that is arranged to provide the regulated output voltage.

11. The voltage regulator circuit of claim 1, further comprising:
a voltage divider circuit that is arranged to provide a feedback signal that is based on the regulated output voltage, wherein the error amplifier input signal is based, in part, on the feedback signal.

12. The voltage regulator circuit of claim 11, wherein the error amplifier input signal is the feedback signal.

13. The voltage regulator circuit of claim 11, further comprising a buffer circuit that is arranged to buffer the feedback voltage to provide the error amplifier input signal.

14. A switching voltage regulator circuit, comprising:
a follower circuit that is coupled to a first node;
a soft-start capacitor circuit that is coupled to the first node;
an error amplifier circuit including a first input that is coupled to the first node, a second input that is coupled to a second node, and an output;
an output stage that is coupled to an output node and the output of the error amplifier circuit, wherein the output stage includes:
a pulse modulation control circuit that is coupled to the output of the error amplifier circuit; and
a switch circuit that is coupled to the pulse modulation control circuit; and
a soft-start switch circuit that is coupled between the first and second nodes.

15. The switching voltage regulator circuit of claim 14, wherein the soft-start switch circuit is arranged to open and close responsive to an enable signal such that a voltage at the first node tracks a voltage at the output node if the enable signal corresponds to an inactive level.

16. The switching voltage regulator circuit of claim 14, wherein the soft-switch circuit is arranged to adjust a resistance between the first and second nodes responsive to an enable signal such that the first and second nodes are substantially shorted together if the enable signal is inactive, and such that the soft-switch circuit is substantially an open circuit if the enable signal is active.

17. The switching voltage regulator circuit of claim 14, wherein the pulse modulation circuit includes at least one of a pulse width modulation control circuit and a pulse frequency modulation control circuit.

18. The switching voltage regulator circuit of claim 14, further comprising:
a voltage divider circuit including a first impedance circuit and a second impedance circuit, wherein the first impedance circuit is coupled between the output node and the second node, and wherein the second impedance circuit is coupled to the second node; and
a buffer circuit that is coupled between the voltage divider circuit and the second node.

19. The switching voltage regulator circuit of claim 14, wherein the output stage further includes:
another switch circuit that is coupled to the switch circuit and the pulse modulation control circuit; and
an inductor that is coupled to the switch circuit, the other switch circuit, and the output node,
wherein the error amplifier circuit is arranged to provide an error signal at the output of the error amplifier circuit; the pulse modulation control circuit is arranged to provide first and second switch control signals in response to error signal; the switch circuit is arranged to open and close responsive to the first switch control signal; the other switch circuit is arranged to open and close responsive to the second switch control signal; the pulse modulation control circuit is configured to adjust a duty cycle that is associated with the first control signal responsive to the error signal; and wherein the pulse modulation control circuit is arranged to provide the second control signal such that the second control signal corresponds to a non-asserted level if the enable signal corresponds to an inactive level, and such that the second control signal corresponds to an inverse of the first control signal if the enable signal corresponds to an active level.

20. A voltage regulator circuit, comprising:
means for providing, at a first node, a soft-start reference signal based, in part, on an input reference signal;
a means for providing an error signal by amplifying a voltage difference between the first node and a second node, wherein the means for providing the error signal is arranged to receive, at the second node, a signal that is based, in part, on a regulated output voltage;
means for providing a regulated output voltage based, in part, on an input voltage and the error signal; and
means for substantially shorting the first and second nodes together if an enable signal corresponds to an inactive level.

* * * * *

UNITED STATES PATENT AND TRADEMARK OFFICE
CERTIFICATE OF CORRECTION

PATENT NO. : 6,969,977 B1
DATED : November 29, 2005
INVENTOR(S) : Gregory Smith

It is certified that error appears in the above-identified patent and that said Letters Patent is hereby corrected as shown below:

Column 5,
Lines 12 and 15, delete "enable" and insert -- Enable --.

Signed and Sealed this

Twenty-fifth Day of April, 2006

JON W. DUDAS
*Director of the United States Patent and Trademark Office*